Jan. 23, 1968  P. SUVADA  3,365,344
METHOD OF PRODUCING THREE DIMENSIONAL INDICIA
ON A PLASTIC SURFACE
Filed Nov. 26, 1963  2 Sheets-Sheet 1
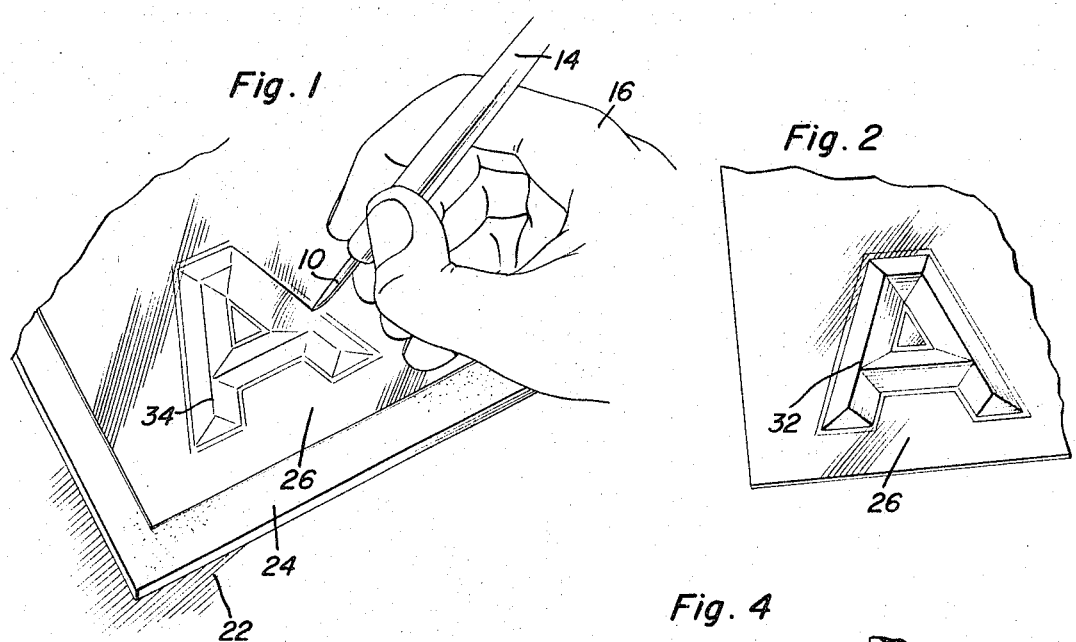
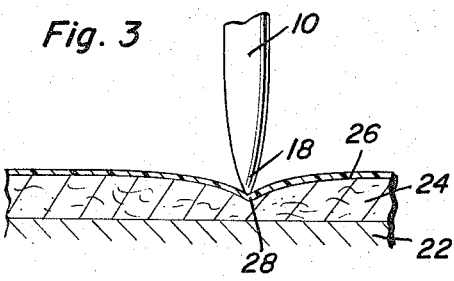
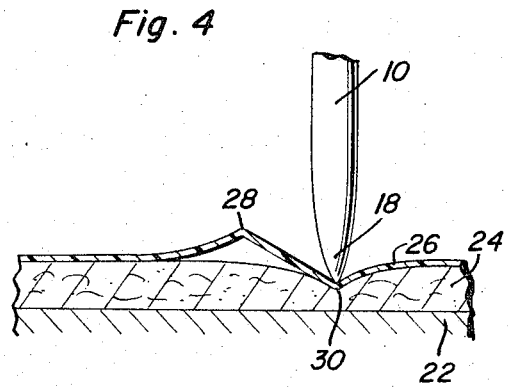
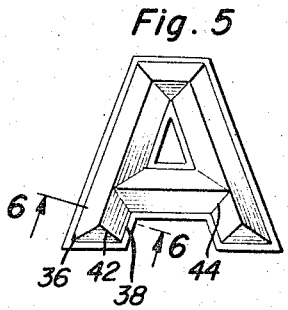
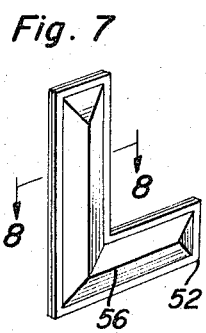
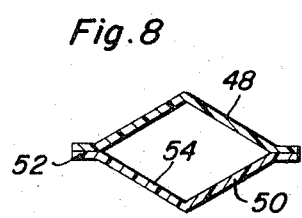
Paul Suvada
INVENTOR.
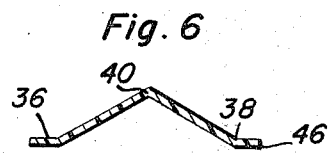

Jan. 23, 1968 P. SUVADA 3,365,344
METHOD OF PRODUCING THREE DIMENSIONAL INDICIA
ON A PLASTIC SURFACE
Filed Nov. 26, 1963 2 Sheets-Sheet 2
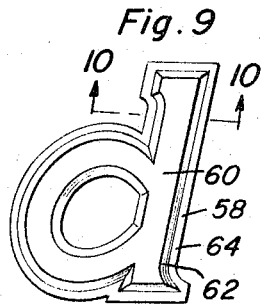
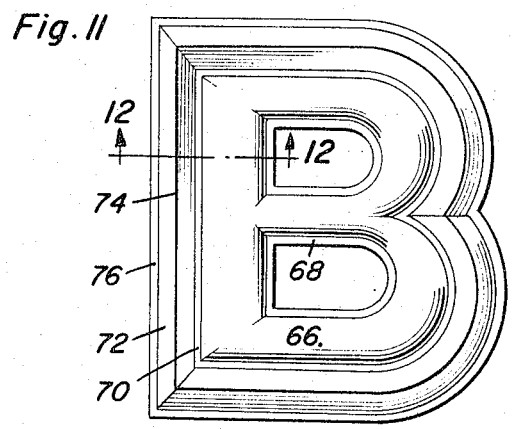
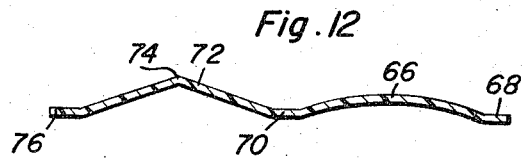
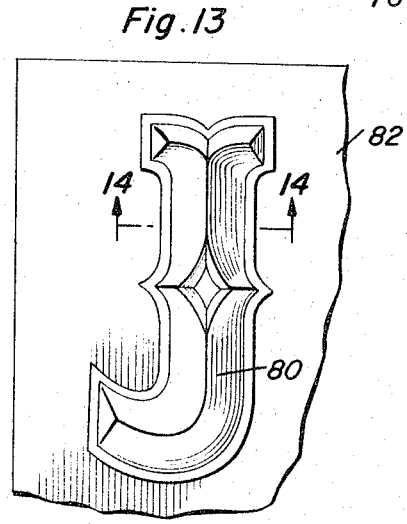
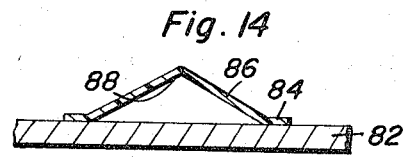
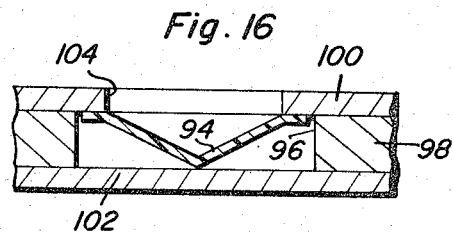
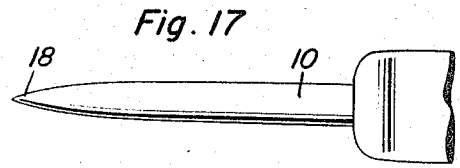
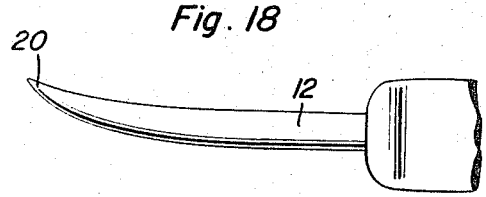
Paul Suvada
INVENTOR.
BY *Clarence A. O'Brien*
*and Harvey B. Jacobson*
Attorneys

United States Patent Office 3,365,344
Patented Jan. 23, 1968

3,365,344
METHOD OF PRODUCING THREE DIMENSIONAL INDICIA ON A PLASTIC SURFACE
Paul Suvada, 11012 Hulda Ave.,
Cleveland, Ohio 44104
Filed Nov. 26, 1963, Ser. No. 325,856
2 Claims. (Cl. 156—62)

The present invention generally relates to the formation of three dimensional letters, numerals, texts, embossings, emblems, surface decorations and the like by following a certain procedure for converting a flat sheet into a three dimensional character.

It, of course, is well known to project or reject forms from solid material or on solid material by means of various procedures such as carving, hammering or the like which is a long and elaborate process and requires a very high degree of skill and also special equipment or tools. Paper sculpturing has been accomplished by first scoring the paper and then folding the paper into angular planes for forming a three dimensional character to the paper so sculptured. This is, of course, of temporary character.

Accordingly, it is the primary object of the present invention to provide a relatively inexpensive and easy method employing simple tools for creating three dimensional effects on commercially available plastic sheet material without requiring any high degree of specialized skills and without requiring any expensive special equipment thereby rendering the process of the present invention economically feasible as well as practical.

Another object of the invention is to provide a three dimensional character formed from plastic sheet of light gauge plastic material for indoor as well as outdoor display.

Still another object of the present invention is to provide a plastic material having both sides glossy or having one side glossy for receiving metal or a metallic substance and having a non-glossy or roughened side for the purposes of accepting markings, reducing drag of the forming tool, requiring less varnishing of finished work and reduced dust attracting static electricity with the invention also being to provide the glossy sides of the sheets with maskings for enabling transfer of original layout from paper to plastic or doing the layout direct on the plastic and to keep that side chemically clean until glazing, metalizing or coloring.

Another important object of the invention is to provide plastic material which may be pre-metalized.

A further object of the invention is to provide lubricant in liquid or solid form having soapy, waxy or graphite consistency for either the metalized or non-metalized side of the plastic to obtain a drag-proof glide of the forming tool.

Another important object of the invention is to provide sealed hollow parts of elevated ribs with regular or semi-permanent dyes and colors for interior as well as for exterior exposures.

Another feature of the invention is to provide a variety of forms on plastic having appearances of prismatic, bevelled edged flat, with even, decreasing or increasing widths and being either projections for open face (above level) or recesses (below level) for enclosures under transparent plate to form a finished work.

A further feature of the invention is to provide straight pre-shaped clear or pre-metalized prismatic bevelled edged, flat and rounded strips for inserting or added as straight parts to individually made curves on design faces.

Still another important object of the invention is to provide individually made forms on pre-shaped strips with contour flanges or surfaces for cementing finished plastic shells over solid base or fitting it under transparent plates.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating one of the operations in the present process;

FIGURE 2 illustrates a letter formed from a plastic sheet by employing the present process;

FIGURE 3 is a fragmental sectional view illustrating one step in forming characters from plastic sheets;

FIGURE 4 is a sectional view similar to FIGURE 3 but illustrating another step in the formation of three dimensional characters;

FIGURE 5 is a plan view of one form of three dimensional letter;

FIGURE 6 is a detailed sectional view taken substantially upon a plane passing along section line 6—6 illustrating the structure of the three dimensional letter;

FIGURE 7 is a perspective view illustrating another form of letter in which two three dimensional letters are connected in back-to-back relation;

FIGURE 8 is a sectional view taken substantially upon a plane passing along section line 8—8 of FIGURE 7 illustrating further structural details of this form of the invention;

FIGURE 9 is a plan view of another type of letter formed by practicing the present invention;

FIGURE 10 is a detailed sectional view taken substantially upon a plane passing along section line 10—10 of FIGURE 9 illustrating further structural details of this form of the invention;

FIGURE 11 is a plan view of another type of letter formed with the present invention;

FIGURE 12 is a detailed sectional view taken substantially upon a plane passing along section line 12—12 of FIGURE 11 illustrating further structural details of this letter;

FIGURE 13 is a plan view illustrating a letter mounted upon a flat backing plate;

FIGURE 14 is a detailed sectional view taken substantially upon a plane passing along section line 14—14 of FIGURE 13 illustrating the structural features of this form of the invention;

FIGURE 15 is a sectional view illustrating another manner of mounting a letter on a supporting plate;

FIGURE 16 is a detailed sectional view illustrating another manner of mounting three dimensional letters between plates;

FIGURE 17 is an elevational view of one of the tools which may be employed in practicing the present invention; and FIGURE 18 is a plan view of another tool employed in the present invention.

The present invention employs the use of certain hand tools such as scribers 10 and 12 each having a handle 14 for grasping with the hand 16 in an obvious manner. The tool 10 is substantially straight and provided with a tapered pointed end 18 while the tool 12 is also provided with a tapered end which is curved as indicated by numeral 20. Other equipment employed in the present invention includes a supporting base 22 which may be any suitable supporting surface which may be a desk top, drawing board or the like. Overlying the smooth supporting surface 22 is a pad 24 of felt, rubber or a plurality of layers of soft paper and overlying the pad 24 is a plastic sheet 26 which may be any commercially available plastic of light gauge such as a thickness between .005 inch and .025 inch. The points 18 and 20 of the tools 10 and 12 are rounded and are polished steel points for forming lines in the plastic sheet by drawing the tool across the plastic sheet 26 while applying pressure thereto as illustrated in FIGURES 3 and 4. The line being formed in FIGURE 3 is designated by numeral 28 and when the plastic sheet 26 is inverted as illustrated in FIGURE 4, this line 28 will be permanently formed therein and another line 30 is then formed in the plastic sheet 26 thus enabling a three dimensional configuration to be imparted to the plastic sheet 26 with the surfaces thereof either projecting above level or rejecting below level.

The outer lines of a design are first traced on or marked directly onto the side of the plastic sheet 26 where the projections or ribs 32 are to be formed in the plastic sheet 26. If the ribs 32 are to be formed as projections above level or open face, the lines are placed onto the front surface of the plastic sheet with such lines being designated by numeral 34 in FIGURE 1. If the ribs are to be recesses below level, then the lines are made on the back of the sheet. Thereafter, the sheet is placed over the pad 24 as illustrated in FIGURE 1 and the tool 10 is employed to impress the outside lines into the plastic sheet in the manner illustrated in FIGURE 3. When all the outer lines are impressed into the sheet 26, the sheet 26 is then inverted and for prismatic bar and the center lines are impressed in along with the positive corners and the sheet is then inverted again and the negative corners are broken in or impressed in with the forming tool.

In referring to FIGURE 5, the outer lines are impressed first and are designated by numerals 36 and 38 and this arrangement is illustrated in FIGURE 6 also. The letter is then inverted and the center line 40 of the rib is then formed along with the positive edges of the corners 42. The negative corners 44 are formed when the plastic sheet is again inverted to its original orientation. Thus, in FIGURE 5, a single three dimensional letter has been formed in which there is a central rib and parallel flanges 46 along the periphery thereof.

FIGURES 7 and 8 illustrate two individual letters 48 and 50 which have been attached together with the flanges 52 thereof cemented together thus forming a hollow interior 54. Thus, a three dimensional letter is formed in which both sides thereof project above level. Various letters may be provided but as illustrated in FIGURES 7 and 8, the letter L has a rib with a center line 56 and flanges 52 which are connected by suitable cement, adhesive, glue or the like.

FIGURES 9 and 10 disclose another type of letter 58 which has a flat central portion 60 and a downwardly inclined bevelled edge portion 62 terminating in an outwardly extending peripheral flange 64. In forming this type of letter, two parallel lines are impressed from opposite sides of the sheet of plastic material thus forming the spaced impressions which define the limits of the bevelled or inclined portion 62.

FIGURES 11 and 12 illustrate a soft shoulder rounded letter which includes a rounded inner portion 66 having an inner and outer flange 70. Projecting outwardly from the flange 70 is a rib 72 having a center line 74 with the outer edge of the rib 72 having a flange 76. Parallel impressions are formed on one surface along the junctures between the flanges 68, 70 and 76 and their connecting portions and the sheet is then inverted and the impression made along center rib line 74 and the letter then again inverted and the corner lines are formed either positive or negative.

FIGURES 13 and 14 disclose an open face letter 80 cemented to a suitable supporting panel or surface 82. The letter 80 includes flanges 84 which are cemented to the panel 82 in any suitable manner and a rib 86 together with a center line 88. FIGURE 15 illustrates a recess or below level letter 90 supported between edges of an opening in a supporting plate 92 with the configuration of the letter 90 being the same as the letter 80. FIGURE 16 illustrates a letter 94 received in an opening 96 in a panel 98 and being cemented to an overlying plate 100 and an underlying plate 102 is disposed against the opposite surface of the letter 94 and an opening 104 is formed in the plate 100 and these figures illustrate other embodiments of attaching a three dimensional letter to a supporting plate.

In the event of use of open face, projected or rejected letters or their combinations, the letters are cemented to a suitable solid base and the counter-surface of the flanges as illustrated in FIGURE 16 are adhered to the underneath surface of the plate and are blanked out above with regular paint in accordance with a predetermined opaque color metallic effect.

In the event close face letters are used, the letters or their combinations are placed between a transparent front and an opaque back plate such as illustrated in FIGURE 16. All areas outlining the motif and colors other than metallic are painted out on the back of the transparent front plate beforehand. Before the front and back pieces are fixed together the formed letter is lined up and fitted with the outlines of the painted front and being attached to it to avoid slippage. The two plates with a rim therebetween are then permanently secured together to form a permanent unit.

The plastic sheet is not scored but it is only squeezed or more or less extruded. By fitting the formed letters or sheets on a supporting surface and adhering it to the supporting surface by a suitable cement or the like the angular surfaces gained by extruding or impressing the lines in the plastic will become difinite and permanent. Any type of plastic sheet or film may be employed with the limits of thickness being the significant factor since any kind of commercially available plastic sheet can be used satisfactorily within the limits of not being too rigid to crack or too soft to collapse.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method for producing three dimensional indicia characters, the steps including, taking a generally flat sheet of dry plastic material, the sheet of material being rigid yet of a yieldably deformable construction upon application of pressure thereto, marking out a light line pattern on said sheet, placing said sheet on a compressively yieldable support member so that one side of said sheet engages the support member generally over its entire area with the opposite side thereof exposed to view, applying a work tool in a downward direction to the exposed side of said sheet, moving said tool over and in pressure engagement with the exposed side of said sheet in a path determined by said line pattern, said pressure being applied in a general downward direction only and in an amount sufficient to deformably break the material without penetration thereof to form permanent planar surface portions disposed at a sharp oblique angle with respect to one another on opposite sides of said break, inverting said sheet on said support member, again applying said tool in a downward direction to the exposed side of said sheet and moving said tool over and in pressure engagement with said exposed side in a path determined by the remaining portions of said line pattern, the pressure again being applied in a generally downward direction only and in an amount sufficient to deformably break the material without penetration thereof to form permanent planar surface portions disposed at a sharp oblique angle with respect to one another on opposite sides of said break, to thus finally form a three dimensional indicia character projecting outwardly from the general plane of said sheet corresponding to said marked line pattern, and removing said sheet from engaged contacting relationship with said support member.

2. A method in accordance with claim 1, including the step of cutting out the periphery of the character formed from the sheet of plastic material.

References Cited

UNITED STATES PATENTS

| | | | |
|---|---|---|---|
| 615,026 | 11/1898 | Hulbert | 156—59 |
| 1,869,839 | 8/1932 | Boulard | 156—62 |
| 1,985,725 | 12/1934 | Heinsbergen | 156—62 |
| 2,802,418 | 8/1957 | Carver et al. | 101—401.1 |
| 2,811,800 | 11/1957 | Gesek | 156—62 |
| 3,069,746 | 12/1962 | Scharf | 161—6 |
| 3,250,173 | 5/1966 | Henry | 350—131 |
| 3,294,619 | 12/1966 | Noland | 161—6 X |

EARL M. BERGERT, *Primary Examiner.*

HAROLD ANSHER, *Examiner.*